US008055111B2

(12) United States Patent
Sillard et al.

(10) Patent No.: US 8,055,111 B2
(45) Date of Patent: Nov. 8, 2011

(54) DISPERSION-SHIFTED OPTICAL FIBER

(75) Inventors: Pierre Sillard, Le Chesnay (FR); Elise Regnier, Bievres (FR); Marianne Bigot-Astruc, Marcoussis (FR); Denis Molin, Draveil (FR); Louis-Anne de Montmorillon, Versailles (FR); Simon Richard, Villebon sur Yvette (FR)

(73) Assignee: Draka Comteq, B.V., Amsterdam (NL)

( * ) Notice: Subject to any disclaimer, the term of this patent is extended or adjusted under 35 U.S.C. 154(b) by 214 days.

(21) Appl. No.: 12/418,523

(22) Filed: Apr. 3, 2009

(65) Prior Publication Data
US 2009/0252469 A1 Oct. 8, 2009

(30) Foreign Application Priority Data
Apr. 4, 2008 (FR) ...................................... 08 01868

(51) Int. Cl.
*G02B 6/02* (2006.01)
(52) U.S. Cl. ........ 385/127; 385/123; 385/124; 385/125; 385/126; 385/128
(58) Field of Classification Search .................. 385/123, 385/124, 125, 126, 127, 128
See application file for complete search history.

(56) References Cited

U.S. PATENT DOCUMENTS

| 4,838,643 A | 6/1989 | Hodges et al. |
| 4,852,968 A | 8/1989 | Reed |
| 5,574,816 A | 11/1996 | Yang et al. |
| 5,717,805 A | 2/1998 | Stulpin |
| 5,761,362 A | 6/1998 | Yang et al. |
| 5,911,023 A | 6/1999 | Risch et al. |
| 5,982,968 A | 11/1999 | Stulpin |
| 6,035,087 A | 3/2000 | Bonicel et al. |
| 6,066,397 A | 5/2000 | Risch et al. |
| 6,072,929 A * | 6/2000 | Kato et al. ...................... 385/123 |
| 6,085,009 A | 7/2000 | Risch et al. |
| 6,134,363 A | 10/2000 | Hinson et al. |
| 6,175,677 B1 | 1/2001 | Yang et al. |
| 6,181,857 B1 | 1/2001 | Emeterio et al. |
| 6,210,802 B1 | 4/2001 | Risch et al. |
| 6,215,931 B1 | 4/2001 | Risch et al. |
| 6,314,224 B1 | 11/2001 | Stevens et al. |
| 6,321,012 B1 | 11/2001 | Shen |

(Continued)

FOREIGN PATENT DOCUMENTS
EP 1256554 A1 11/2002
(Continued)

OTHER PUBLICATIONS
U.S. Appl. No. 60/986,737 for "Microbend Resistant Optical Fiber" filed Nov. 9, 2007 [Cited in Specification].

(Continued)

*Primary Examiner* — Jennifer Doan
(74) *Attorney, Agent, or Firm* — Summa, Additon & Ashe, P.A.

(57) ABSTRACT

A dispersion-shifted optical fiber (NZDSF) includes a central core ($r_1$, $Dn_1$), an inner cladding having at least three zones with a first intermediate cladding zone ($r_2$, $Dn_2$), a second ring zone ($r_3$, $Dn_3$) and a third buried trench zone ($W_{tr}$, $Dn_t$). The buried trench zone has an index difference ($Dn_t$) with the optical cladding between $-5 \cdot 10^{-3}$ and $-15 \cdot 10^{-3}$ and has a width ($W_{tr}$) between 2.5 µm and 5.5 µm. The present optical fiber, at a wavelength of 1550 nm, has reduced Rayleigh scattering losses of less than 0.164 dB/km, with limited bending losses.

22 Claims, 2 Drawing Sheets

U.S. PATENT DOCUMENTS

| | | |
|---|---|---|
| 6,321,014 B1 | 11/2001 | Overton et al. |
| 6,334,016 B1 | 12/2001 | Greer, IV |
| 6,335,995 B1 * | 1/2002 | Kato et al. .................. 385/123 |
| 6,381,390 B1 | 4/2002 | Hutton et al. |
| 6,493,491 B1 | 12/2002 | Shen et al. |
| 6,576,164 B2 | 6/2003 | Guenot et al. |
| 6,603,908 B2 | 8/2003 | Dallas et al. |
| 6,618,538 B2 | 9/2003 | Nechitailo et al. |
| 6,658,184 B2 | 12/2003 | Bourget et al. |
| 6,749,446 B2 | 6/2004 | Nechitailo |
| 6,819,850 B2 | 11/2004 | Sillard et al. |
| 6,904,213 B2 | 6/2005 | Fleury et al. |
| 6,912,347 B2 | 6/2005 | Rossi et al. |
| 6,922,515 B2 | 7/2005 | Nechitailo et al. |
| 6,928,222 B2 | 8/2005 | Sillard et al. |
| 6,941,049 B2 | 9/2005 | Risch et al. |
| 7,045,010 B2 | 5/2006 | Sturman, Jr. |
| 7,162,128 B2 | 1/2007 | Lovie et al. |
| 7,171,092 B2 | 1/2007 | de Montmorillon |
| 7,322,122 B2 | 1/2008 | Overton et al. |
| 7,327,921 B2 | 2/2008 | Sillard et al. |
| 7,346,244 B2 | 3/2008 | Gowan et al. |
| 7,356,234 B2 | 4/2008 | de Montmorillon et al. |
| 7,428,361 B2 | 9/2008 | Bigot-Astruc et al. |
| 7,483,613 B2 | 1/2009 | Bigot-Astruc et al. |
| 2007/0019915 A1 | 1/2007 | Overton et al. |
| 2007/0127878 A1 | 6/2007 | de Montmorillon et al. |
| 2007/0183726 A1 | 8/2007 | Nothofer et al. |
| 2007/0263960 A1 | 11/2007 | Lock et al. |
| 2007/0280615 A1 | 12/2007 | de Montmorillon et al. |
| 2008/0037942 A1 | 2/2008 | Tatat |
| 2008/0145010 A1 | 6/2008 | Overton et al. |
| 2008/0152288 A1 | 6/2008 | Flammer et al. |
| 2008/0181565 A1 | 7/2008 | Arashitani et al. |
| 2008/0292262 A1 | 11/2008 | Overton et al. |
| 2008/0317410 A1 | 12/2008 | Griffioen et al. |
| 2009/0003779 A1 | 1/2009 | Parris |
| 2009/0003781 A1 | 1/2009 | Parris et al. |
| 2009/0003785 A1 | 1/2009 | Parris |
| 2009/0041414 A1 | 2/2009 | Lavenne et al. |
| 2009/0175583 A1 | 7/2009 | Overton |
| 2009/0252469 A1 | 10/2009 | Sillard et al. |

FOREIGN PATENT DOCUMENTS

| | | |
|---|---|---|
| EP | 1288685 A1 | 3/2003 |
| EP | 1382981 A1 | 1/2004 |
| EP | 1434071 A1 | 6/2004 |
| EP | 1610160 A1 | 12/2005 |
| EP | 1734390 A1 | 12/2006 |
| EP | 1865348 A2 | 12/2007 |
| EP | 1921478 A1 | 5/2008 |
| EP | 2107402 A1 | 10/2009 |
| WO | 2007/013923 A2 | 2/2007 |
| WO | 2009/062131 A1 | 5/2009 |

OTHER PUBLICATIONS

U.S. Appl. No. 61/041,484 for "Microbend Resistant Optical Fiber" filed Apr. 1, 2008 [Cited in Specification].

U.S. Appl. No. 61/112,595 for "Microbend Resistant Optical Fiber" filed Nov. 7, 2008 [Cited in Specification].

U.S. Appl. No. 12/098,804 for Transmission Optical Fiber Having Large Effective Area (Sillard et al.) [Cited in Specification].

U.S. Appl. No. 61/101,337 for "Single Mode Optical Fiber" filed Sep. 30, 2008 [Cited in Specification].

U.S. Appl. No. 61/112,006 for "Bend-Insensitive Single Mode Optical Fiber" filed Nov. 6, 2008 [Cited in Specification].

U.S. Appl. No. 61/112,374 for "Bend Insensitive Single Mode Optical Fiber" filed Nov. 7, 2008 [Cited in Specification].

French Search Report and Written Opinion in counterpart French Application No. 0801868, dated Oct. 31, 2008.

Nagayama, K. et al., "Ultra Low Loss (0.1484 dB/km) Pure Silica Core Fiber", SEI Technical Review, No. 57, Jan. 2004 [Cited in Specification].

Ohashi M. et al., "Optical Loss Property of Silica—Based Single Mode Fibers", Journal of Lightwave Technology, vol. 10, No. 5, May 1992, pp. 539-543 [Cited in Specification].

Tsujikawa K. et al., "Rayleigh Scattering Reduction Method for Silica-Based Optical Fiber", Journal of Lightwave Technology, vol. 18, No. 11, Nov. 2000, pp. 1528-1532 [Cited in Specification].

Mukasa K. et al., "A high performance GeO2/SiO2 NZ-DSF and the prospects for future improvement using Holey Fiber technology", ECOC'05, Tu 1.4.6. [Cited in Specification].

European Search Report in counterpart European Application No. 09004952 dated May 6, 2009, pp. 1-7 [all references previously cited].

European Office Action in counterpart European Application No. 09004952 dated May 19, 2011, pp. 1-4.

* cited by examiner

DISPERSION-SHIFTED OPTICAL FIBER

CROSS-REFERENCE TO PRIORITY APPLICATION

This application claims the benefit of pending French application Ser. No. 08/01868 for "Dispersion Shifted Optical Fiber" (filed Apr. 4, 2008, at the French Patent Office), which is hereby incorporated by reference in its entirety.

FIELD OF THE INVENTION

The present invention relates to the field of optical fiber transmissions and, more specifically, to a dispersion-shifted fiber having reduced attenuation without an increase in bending losses.

BACKGROUND OF THE INVENTION

A refractive index profile of an optical fiber is a graphical representation of the value of the refractive index as a function of optical fiber radius. Conventionally, the distance r to the center of the optical fiber is shown along the abscissa (i.e., the x axis), and the difference between the refractive index at radius r and the refractive index of the outer optical cladding of the optical fiber is shown along the ordinate axis (i.e., the y axis). The outer optical cladding has a constant refractive index and usually consists of pure silica. The outer optical cladding, however, may also contain one or more dopants. The refractive index profile is referred to as a "step" profile, "trapezoidal" profile, or "triangular" profile (e.g., an "alpha" profile) for graphs having the respective shapes of a step, a trapezoid, or a triangle. These curves are generally examples of the theoretical or set profile of the optical fiber. The manufacturing stresses of the optical fiber may lead to a slightly different profile.

An optical fiber typically includes an optical core, whose function is to transmit and possibly to amplify an optical signal, and an optical cladding, whose function is to confine the optical signal within the core. For this purpose, the refractive indexes of the core $n_c$ and the outer cladding $n_g$ are such that $n_c > n_g$. As is well known, the propagation of an optical signal in a single-mode optical fiber is divided into a fundamental mode (i.e., dominant mode) guided in the core and into secondary modes (i.e., cladding modes) guided over a certain distance in the core-cladding assembly.

As line fibers for terrestrial transmission systems, SSMF (Standard Single Mode Fiber) of dispersion-shifted fibers, also called NZDSF (Non-Zero Dispersion-Shifted Fiber), are conventionally used. Shifted dispersion fibers having non-zero and positive chromatic dispersion for the wavelength at which they are used, typically around 1550 nm, are described as NZDSF+.

Typically, the SSMFs meet specific telecommunications standards and notably the G.652 standard. The SSMFs have an attenuation of about 0.19 dB/km, measured at the wavelength of 1550 nm with a Rayleigh contribution of the order of 0.160 dB/km, an effective area of about 80 $\mu m^2$, an effective cut-off wavelength less than 1350 nm, a positive chromatic dispersion of about 17 ps/(nm·km) at 1550 nm and a positive dispersion slope of 0.058 ps/(nm²·km).

The NZDSF+ fibers, at the wavelength of 1550 nm, have a lower chromatic dispersion than SSMFs, typically between 3 and 14 ps/(nm·km), and a chromatic dispersion slope typically less than 0.1 ps/(nm²·km). The NZDSF+ fibers are generally used for short distance transmission systems and meet specific telecommunications standards, notably the G.655 and G.656 standards.

FIG. 1 shows the set profiles of an SSMF and of a standard NZDSF. The illustrated profiles are set profiles (i.e., representative of the theoretical profile of the fiber). Those having ordinary skill in the art will appreciate that the fiber actually obtained after drawing a fiber from a preform may have a slightly different profile.

Typically, an SSMF includes a central core with a radius of 4.35 μm and having an index difference of $5.2 \times 10^{-3}$ with the outer cladding acting as an optical cladding. A standard NZDSF includes a central core having an index difference $Dn_1$ with an outer cladding, acting as an optical cladding, an intermediate cladding having an index difference $Dn_2$ with the outer cladding, and a ring having an index difference $Dn_3$ with the outer cladding. The refractive indexes in the central core, in the intermediate cladding, and in the ring are substantially constant over all their widths. The width of the core is defined by its radius $r_1$. The widths of the intermediate cladding and the ring are defined by their respective outer radii, $r_2$ and $r_3$. Typically, the central core, the intermediate cladding, the ring, and the outer cladding are obtained by CVD-type deposition in a silica tube and the optical cladding is formed by the tube and the overclad of the tube, generally in natural or doped silica, but it may also be obtained by any other deposition technique (VAD or OVD).

As illustrated in FIG. 1, the NZDSFs have a central core with a smaller radius and a larger index difference than the central core of an SSMF. With this core dimensions, chromatic dispersion may be reduced. The more significant doping of the core as compared with an SSMF, however, introduces more significant Rayleigh scattering losses, larger than 0.164 dB/km leading to an attenuation larger than 0.190 dB/km at 1550 nm.

It is desired to be able to reduce the attenuation of an NZDSF to a value equivalent to that of an SSMF. The attenuation in an optical fiber is due mostly to Rayleigh scattering losses and partly to absorption losses and to losses due to defects of the guide.

In the case of an NZDSF, the presence of dopants in the core in a higher concentration as compared with an SSMF, increases losses by Rayleigh scattering. It is known to reduce Rayleigh scattering losses by making fibers with a pure silica core. This for example is what is proposed in the publication "*Ultra Low Loss (0.1484 dB/km) Pure Silica Core Fiber*" of K. Nagayama et al., published in SEI Technical Review, No. 57, January 2004; or in the publication "*Optical Loss Property of Silica-Based Single Mode Fibers*" of M. Ohashi et al., published in the *Journal of Lightwave Technology*, Vol. 10, No. 5, May 1992, pp. 539-543. The fibers with a pure silica core, however, are costly to manufacture because of the obligation of burying the optical cladding by doping (e.g., with fluorine).

It is also known to reduce losses by Rayleigh scattering by optimizing the fiber-drawing conditions. This for example is what is described in the publication "*Rayleigh Scattering Reduction Method for Silica-Based Optical Fiber*" of K. Tsujikawa et al., published in the *Journal of Lightwave Technology*, Vol. 18, No. 11, November 2000, pp 1528-1532; or in the publication "*A high performance $GeO_2/SiO_2$ NZ-DSF and the prospects for future improvement using Holey Fiber technology*" of K. Mukasa et al., published in ECOC'05, Tu 1.4.6. The proposed solutions are complex to apply industrially, however, because several fiber-drawing temperatures are used with heating and cooling cycles, which are difficult to control.

U.S. Pat. No. 6,576,164, which is hereby incorporated by reference in its entirety, discloses a method for making SSMF wherein the fiber-drawing conditions are optimized in order to reduce the losses by Rayleigh scattering. The method proposed in this document however requires complex equipment with additional cooling devices.

European Patent No. 1,256,554, and its counterpart U.S. Pat. No. 6,904,213, which is hereby incorporated by reference in its entirety, discloses a method for making a step-index fiber comprising a germanium-doped central core and outer and optical claddings with an index less than that of silica. Because the cladding is partly buried, the amount of dopant in the core may be reduced and attenuation in the fiber is reduced. Such a solution is however costly and not directly applicable to an NZDSF type fiber.

European Patent No. 1,288,685, and its counterpart U.S. Pat. No. 6,819,850, which is hereby incorporated by reference in its entirety, discloses a non-zero dispersion-shifted fiber comprising a central core, an intermediate cladding, a ring, a depressed cladding and an optical cladding. Rayleigh losses are not mentioned.

European Patent No. 1,434,071 and its counterpart U.S. Pat. No. 7,171,092, European Patent No. 1,382,981 and its counterpart U.S. Pat. No. 6,928,222, European Patent No. 1,734,390 and its counterpart U.S. Pat. No. 7,428,361, and European Patent No. 1,865,348, each of which is hereby incorporated by reference in its entirety, disclose a dispersion compensating fiber having a central core, an intermediate cladding, a ring, a depressed cladding, and an optical cladding. Rayleigh losses are not mentioned.

European Patent No. 1,610,160, and its counterpart U.S. Pat. No. 7,327,921, which is hereby incorporated by reference in its entirety, discloses a dispersion compensating fiber comprising a central core and at least five inner claddings. Rayleigh losses are not mentioned.

FIG. 2 shows a set profile of an NZDSF for which the whole of the structure would have been partly buried, i.e., lesser doping of the core and with an intermediate cladding and outer cladding having smaller indexes than that of silica. The optical cladding (which can be made by OVD, VAD, CVD, by the tube or by the overclad of the tube in which the fiber preform is made) is maintained in silica for reasons of costs. If such a fiber profile actually reduces the losses by Rayleigh scattering to a value substantially equal to that of an SSMF, the bending losses are very clearly degraded (see Example 2a of the Tables I and II below).

U.S. Pat. No. 4,852,968, which is hereby incorporated by reference in its entirety, discloses that with a buried trench it is possible to reduce the bending losses. However, by simply adding a buried trench to the structure proposed in FIG. 2, it is not possible to reach acceptable bending losses as this is shown by Example 2b of the Tables I and II (below).

Therefore, there exists a need for an NZDSF+ fiber having reduced Rayleigh scattering losses without degradation of the other optical parameters, notably bending losses, and which can be manufactured at reasonable cost and without changing the fiber drawing equipment.

SUMMARY OF THE INVENTION

Accordingly, the invention proposes an NZDSF to achieve an attenuation close to that of an SSMF while limiting bending losses and observing the criteria of the standards relating to NZDSFs, notably in term of dispersion, effective area, and cut-off wavelength.

The invention more particularly proposes a non-zero dispersion-shifted optical fiber (NZDSF) that includes from its center towards its periphery, a central core, an inner cladding including at least three zones and an optical cladding, the central core having a radius and an index difference with the optical cladding, the inner cladding including from the central core to the optical cladding: (i) an intermediate cladding with a radius and index difference with the optical cladding; (ii) ring having a radius and an index difference with the optical cladding; (iii) a buried trench having a radius, a width between 2.5 μm and 5.5 μm and an index difference with the optical cladding between $-5 \times 10^{-3}$ and $-15 \times 10^{-3}$. The non-zero dispersion-shifted optical fiber has (i) Rayleigh scattering losses less than or equal to 0.164 dB/km at the wavelength of 1550 nm; (ii) bending losses less than 0.5 dB/turn for a bending radius of 16 millimeters at the wavelength of 1550 nm; and (iii) bending losses less than 0.5 dB/100 turns for a bending radius of 30 millimeters at 1625 nm.

According to other exemplary embodiments, the optical fiber according to the present invention may include one or more of the following characteristics:

the central core has an index difference with the optical cladding of less than $7.5 \times 10^{-3}$;

the index difference of the intermediate cladding zone with the optical cladding is between $-2.5 \times 10^{-3}$ and $1.5 \times 10^{-3}$;

the index difference of the ring zone with the optical cladding is between 0.0 and $5 \times 10^{-3}$;

the radius of the core is between 2 μm and 4.35 μm;

the outer radius of the intermediate cladding zone is between 4.5 μm and 8.5 μm;

the ring zone has a width between 3 μm and 7.5 μm;

the inner radius of the buried trench zone is larger than 10 μm;

the outer radius of the buried trench zone is less than or equal to 17 μm;

the fiber has, for a wavelength of 1550 nm, a chromatic dispersion of less than 12 ps/(nm·km);

the fiber has, for a wavelength of 1550 nm, a chromatic dispersion slope of less than or equal to 0.09 ps/(nm²·km);

the fiber has an effective cut-off wavelength of less than 1600 nm;

the fiber has an effective area larger than 50 μm².

According to one exemplary embodiment, the fiber further includes a fourth inner cladding zone located between the ring zone and the buried trench zone, this fourth cladding zone having an outer radius and an index difference with the optical cladding between $-2.5 \times 10^{-3}$ and $1 \times 10^{-3}$. According to another exemplary embodiment, the radius of the fourth cladding zone is between 11 μm and 14.5 μm.

The foregoing, as well as other characteristics and advantages of the invention and the manner in which the same are accomplished, is further specified within the following detailed description and its accompanying drawings.

DETAILED DESCRIPTION

Figure 1:
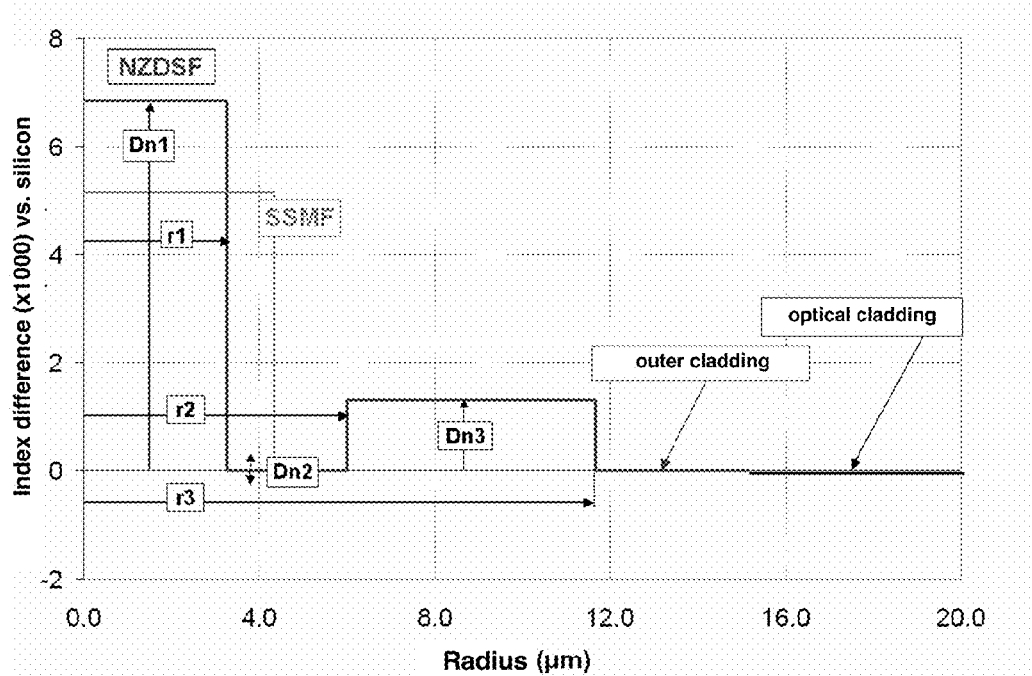
FIG. 1 (previously described) schematically depicts the set profile of an SSMF and of an NZDSF+ not according to the present invention.

The fiber according to the invention is a non-zero dispersion-shifted fiber that has a chromatic dispersion lower than the chromatic dispersion of a standard step-index SSMF. The fiber according to the invention has reduced Rayleigh scattering losses (e.g., less than 0.164 dB/km at 1550 nm). The fiber according to the invention further has limited bending losses (e.g., less than 0.5 dB/turn for a bending radius of 16 millimeters at 1550 nm and less than 0.5 dB/100 turns for a bending radius of 30 millimeters at 1625 nm.

The fiber of the invention will be described with reference to FIGS. 3 and 4, which illustrate set profiles for two possible embodiments.

The NZDSF according to the invention includes a central core having an index difference $Dn_1$ with an outer cladding, acting as an optical cladding, and at least three inner cladding zones between the central core and the optical cladding. In this context, the central core and the inner cladding zones are obtained by CVD type deposition in a silica tube and the optical cladding is formed by the tube and the overclad of the tube generally in natural or doped silica, but it may also be obtained by any other deposition technique (VAD or OVD).

A first cladding zone is an intermediate cladding having an index difference $Dn_2$ with the optical cladding. A second cladding zone is a ring having an index difference $Dn_3$ with the optical cladding. A third cladding zone is a buried trench having an index difference $Dn_t$ with the optical cladding. In FIG. 3, a fourth cladding zone is present in the form of a step located between the ring and the buried trench and having an index difference $Dn_4$ with the optical cladding. The refractive indexes of the intermediate cladding $Dn_2$, the ring $Dn_3$, the buried trench $Dn_t$, and, if necessary, of the step $Dn_4$, are substantially constant over their respective widths. The central core here has a step shape, but it may also have the shape of a trapezium, triangle or alpha. The width of the core is defined by its radius $r_1$ and the claddings by their respective outer radii, $r_2$-$r_4$. The width of the buried trench is defined by a radius difference $W_{tr}$.

Rayleigh losses are, inter alia, dependent upon the index profile of the core $Dn_1$, the index profiles of the inner and outer cladding $Dn_2$, $Dn_3$, $Dn_4$, and the optical filed distribution across the fiber section given by:

$$\frac{\int \alpha(r) \cdot \Psi^2(r) r dr}{\int \Psi^2(r) r dr}$$

wherein, r is the radius over the fiber cross section, $\Psi(r)$ is the optical field, $\alpha(r)$ is the Rayleigh coefficient.

The fiber according to the invention is an NZDSF with a central core having a radius $r_1$ larger than 2 μm but less than that of an SSMF (e.g., less than 4.35 μm), typically less than 4.00 μm, and an index difference $Dn_1$ with the optical cladding larger than that of an SSMF (e.g., larger than $5.0 \times 10^{-3}$) but less than $7.5 \times 10^{-3}$ to limit the amount of dopants in the core. With this core profile of the fiber, it is possible to reduce chromatic dispersion and by limiting the amount of dopant in the core, it is possible to control the losses by Rayleigh scattering.

The fiber according to the invention also includes a cladding between the core and the optical cladding having at least three zones. A first zone is an intermediate cladding having a radius $r_2$ and an index difference $Dn_2$ with the optical cladding. This intermediate cladding may be slightly buried, it has an index difference $Dn_2$ with the outer cladding between $-2.5 \times 10^{-3}$ and $1.5 \times 10^{-3}$. The outer radius $r_2$ of this intermediate cladding is between 4.5 μm and 8.5 μm. A second zone is a ring having a radius $r_3$ and an index difference $Dn_3$ with the optical cladding. The ring is not buried, unlike the profile of FIG. 2, and has an index difference $Dn_3$ with the optical cladding between 0.0 and $5.10^{-3}$. The width of the ring $(r_3-r_2)$ is between 3 μm and 7.5 μm. A third zone is a buried trench having a radius $r_{tr}$, a controlled width $W_{tr}$, and controlled depth $Dn_t$. As illustrated in FIG. 3, a fourth cladding zone, having a radius $r_4$ and an index difference $Dn_4$ with the optical cladding, may be added in the form of a step located between the ring and the buried trench. This step is narrower than the ring and the buried trench, and it may be slightly buried. It may have an outer radius $r_4$ between 11 μm and 14.5 μm as well as an index difference with the optical cladding $Dn_4$ between $-2.5 \times 10^{-3}$ and $1 \times 10^{-3}$.

With a buried trench depth $Dn_t$ between $-15 \times 10^{-3}$ and $-5 \times 10^{-3}$ and a buried trench width $W_{tr}$ between 2.5 μm and 5.5 μm, it is possible to efficiently limit bending losses while controlling the cut-off frequency (i.e., while limiting the propagation of higher order modes in the fiber). The fiber according to the invention thus has an effective cut-off wavelength less than 1600 nm, and preferably a cable cut-off wavelength less than 1450 nm, which complies with the constraints imposed by the G.655 and G.656 standards.

The buried trench zone may have an outer radius $r_{tr}$ limited to 17 μm in order to limit the manufacturing cost.

The buried trench zone, in combination with the intermediate cladding and ring zones, reduces the losses by Rayleigh scattering while limiting bending losses without perturbing the other optical parameters of the fiber. The buried trench zone is sufficiently distant from the core by the presence of the intermediate cladding and of the ring, with an inner radius larger than or equal to 10 μm. By way of example and as depicted in FIGS. 3-4, the inner radius of the buried trench may be represented by the radius of the ring ($r_3$) or the radius of the fourth cladding ($r_4$). With this distance of the trench relative to the central core, it is possible not to perturb too much the propagation of the fundamental mode in order to retain effective area and dispersion values compliant with the constraints imposed by the G.655 and G.656 standards. The trench is also sufficiently deep and narrow to guarantee a reduction in bending losses and to control the losses of the modes of directly higher orders (LP11 and LP02), and therefore the cut-off wavelength that follows therefrom.

Table 1 (below) provides six examples of possible index profiles for a transmission fiber according to the invention (Examples 3 and 4) and five examples not compliant with the invention (Examples 1 and 2) by comparison with a standard SSMF. The first column assigns a reference to each profile. The following columns also give the values of the radii of each section ($r_1$-$r_4$) as well as the width of the buried trench ($W_{tr}$). The following columns give the values of the index differences of each section with the optical cladding ($Dn_1$-$Dn_4$ and $Dn_t$). The index values are measured at a wavelength of 633 nm. The fibers of the examples of Table 1 have an outer diameter of 125 μm. The values of Table 1 correspond to set profiles of fibers.

TABLE 1

| profile | $r_1$ (μm) | $r_2$ (μm) | $r_3$ (μm) | $r_4$ (μm) | $W_{tr}$ (μm) | $Dn_1$ (·10³) | $Dn_2$ (·10³) | $Dn_3$ (·10³) | $Dn_4$ (·10³) | $Dn_t$ (·10³) |
|---|---|---|---|---|---|---|---|---|---|---|
| SSMF | 4.35 | | | | | 52 | | | | |
| 1a | 3.26 | 6.00 | 11.65 | | | 6.9 | 0.0 | 13 | | |
| 1b | 2.86 | 7.87 | 10.82 | | | 7.9 | 0.0 | 2.3 | | |
| 1c | 2.50 | 4.03 | 8.13 | | | 8.5 | 0.0 | 25 | | |
| 2a | 3.26 | 6.00 | 11.65 | 15.10 | | 5.4 | −1.5 | −0.2 | −1.5 | |
| 2b | 3.26 | 6.00 | 11.65 | 13.14 | 2.86 | 5.4 | −1.5 | −0.2 | −1.5 | −6 |
| 3a | 3.36 | 5.94 | 9.98 | 11.20 | 4.80 | 5.7 | −1.5 | 1.8 | −1.5 | −5.0 |
| 3b | 3.73 | 7.19 | 11.56 | 14.11 | 2.89 | 5.7 | −1.5 | 2.5 | −1.5 | −5.9 |
| 3c | 3.28 | 7.38 | 11.52 | 12.08 | 3.92 | 6.5 | −1.5 | 2.8 | −1.5 | −6.0 |
| 4a | 3.52 | 5.51 | 11.94 | | 4.06 | 5.7 | −1.5 | 1.5 | | −6.0 |
| 4b | 3.12 | 7.31 | 11.78 | | 4.22 | 6.4 | −0.6 | 2.6 | | −6.0 |
| 4c | 2.64 | 8.10 | 11.92 | | 4.08 | 7.0 | 0.6 | 2.7 | | −6.0 |

The fiber according to the invention is illustrated in a non-limiting way by the examples of the above Table. Notably, the fiber according to the invention has a narrower central core than an SSMF and with a larger index difference than an SSMF. It is also noted that that the fiber according to the invention has at least three cladding zones between the central core and the optical cladding, one of these zones being a buried trench ($W_{tr}$, $Dn_t$) having a width between 2.5 μm and 5.5 μm and an index difference with the optical cladding between $-5 \times 10^{-3}$ and $-15 \times 10^{-3}$. The buried trench zone is relatively distant from the central core, with an inner radius larger than 10 μm. With this distance of the trench relatively to the central core, it is possible not to perturb too much the propagation of the fundamental mode in order to retain effective area and dispersion values compliant with the constraints imposed by the G.655 and G.656 standards. Moreover, the width and depth of the trench guarantee reduction in bending losses and to control the losses of the modes of directly higher orders (LP11 and LP02) and therefore the cut-off wavelength that follows therefrom.

Furthermore, it is noted in Table I that the central core of the fiber according to the invention has an index difference $Dn_1$ with the optical cladding less than $7.5 \times 10^{-3}$ but larger than that of an SSMF (e.g., larger than $5.0 \times 10^{-3}$). The intermediate cladding zone $Dn_2$ has an index difference with the optical cladding between $-2.5 \times 10^{-3}$ and $1.5 \times 10^{-3}$. The ring zone $Dn_3$ has an index difference with the optical cladding between 0.0 and $5 \times 10^{-3}$. The fourth cladding zone, if present, is narrower and less buried than the buried cladding zone (or not buried at all). This fourth cladding zone has an index difference $Dn_4$ with the optical cladding between $-2.5 \times 10^{-3}$ and $1 \times 10^{-3}$. In Table I, the central core of the fiber is narrower than an SSMF, with a radius $r_1$ between 2 μm and 4.0 μm.

The NZDSF according to the invention, having an index profile as previously described, has reduced Rayleigh scattering losses and consequently an attenuation that is close to that of an SSMF without any increase in the bending losses. Moreover, the NZDSF having an index profile according to the invention meets the criteria of the G.655 and G.656 standards as defined in the ITU-T recommendations.

Table II (below) illustrates optical characteristics for the transmission fibers corresponding to the index profiles of Table I. In Table II, the first column repeats the references of Table I. The following columns provide for each fiber profile, the chromatic dispersion values D and the dispersion slope values P at the wavelength of 1550 nm and the effective area values $A_{eff}$ at the wavelength of 1550 nm. The following columns provide for each fiber profile the Rayleigh scattering loss values at the wavelength of 1550 nm and bending loss values PPC, respectively over a radius of 10 millimeters at the wavelength of 1625 nm, over a radius of 16 millimeters at the wavelength of 1550 nm, over a radius of 25 millimeters at the wavelength of 1550 nm, and over a radius of 30 millimeters at the wavelength of 1625 nm. The last column provides for each profile the values of the effective cut-off wavelength ($\lambda_{Ceff}$) as measured over two meters of fiber according to the current standards.

TABLE 2

| profile | D @1550 nm ps/ (nm·km) | P @1550 nm ps/ (nm²·km) | $A_{eff}$ @1550 nm (μm²) | Rayleigh @1550 nm (dB/km) | PPC (10 mm) @1625 nm (dB/m) | PPC (16 mm) @1550 nm (dB/turn) | PPC (25 mm) @1550 nm (dB/100 turns) | PPC (30 mm) @1625 nm (dB/100 turns) | $\lambda_{Ceff}$ (μm) |
|---|---|---|---|---|---|---|---|---|---|
| SSMF | 17 | 0.058 | 80 | 0.160 | <100 | <0.5 | <0.05 | <0.05 | <1350 |
| 1a | 8 | 0.055 | 65 | 0.165 | <100 | <0.1 | <0.01 | <0.01 | <1400 |
| 1b | 4.5 | 0.045 | 55 | 0.166 | <100 | <0.1 | <0.01 | <0.01 | <1400 |
| 1c | 4.2 | 0.084 | 70 | 0.166 | <100 | <0.1 | <0.01 | <0.01 | <1450 |
| 2a | 7.7 | 0.050 | 65 | 0.160 | >200 | >1 | >50 | >100 | <1200 |
| 2b | 8.6 | 0.056 | 65 | 0.160 | <100 | >0.5 | >10 | >10 | <1200 |
| 3a | 8.5 | 0.070 | 75 | 0.161 | <100 | <0.1 | <0.5 | <0.5 | <1200 |
| 3b | 8.0 | 0.055 | 75 | 0.163 | <100 | <0.05 | <0.02 | <0.02 | <1500 |
| 3c | 4.5 | 0.050 | 60 | 0.164 | <100 | <0.05 | <0.05 | <0.05 | <1500 |
| 4a | 9.0 | 0.070 | 80 | 0.161 | <100 | <0.1 | <0.05 | <0.05 | <1350 |
| 4b | 5.0 | 0.065 | 70 | 0.162 | <100 | <0.1 | <0.05 | <0.05 | <1500 |
| 4c | 4.5 | 0.083 | 77 | 0.159 | <100 | <0.1 | <0.05 | <0.05 | <1550 |

Figure 2:
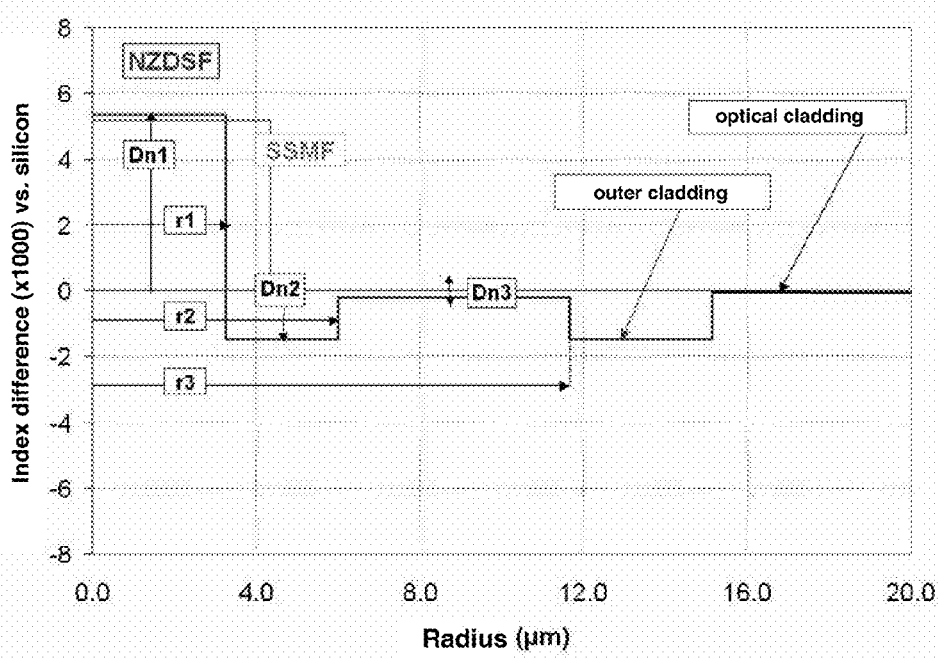
FIG. 2 (previously described) schematically depicts the set profile of an NZDSF+ not according to the present invention.

Examples 1a, 1b, and 1c, which are outside the present invention, correspond to a standard NZDSF as illustrated in FIG. 1. Examples 2a and 2b are also outside the invention. Example 2a is illustrated in FIG. 2 and corresponds to the fiber of Example 1 being buried by $1.5 \times 10^{-3}$ relatively to the outer optical cladding. Example 2b is not illustrated but corresponds to the profile of Example 2a with an additional trench.

It is noted that the fibers of Examples 1 have an attenuation higher than that of an SSMF and that the fibers of Examples 2 have an attenuation equivalent to that of SSMF but with increased bending losses.

Figure 3:
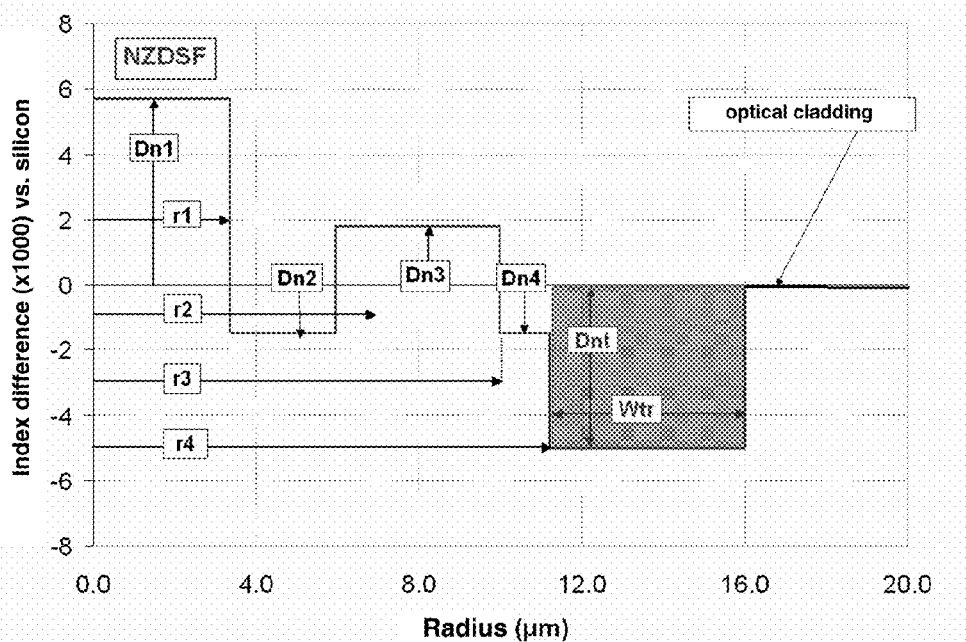
FIG. 3 schematically depicts the set profile of an NZDSF+ fiber according to a first embodiment of the present invention.
Figure 4:
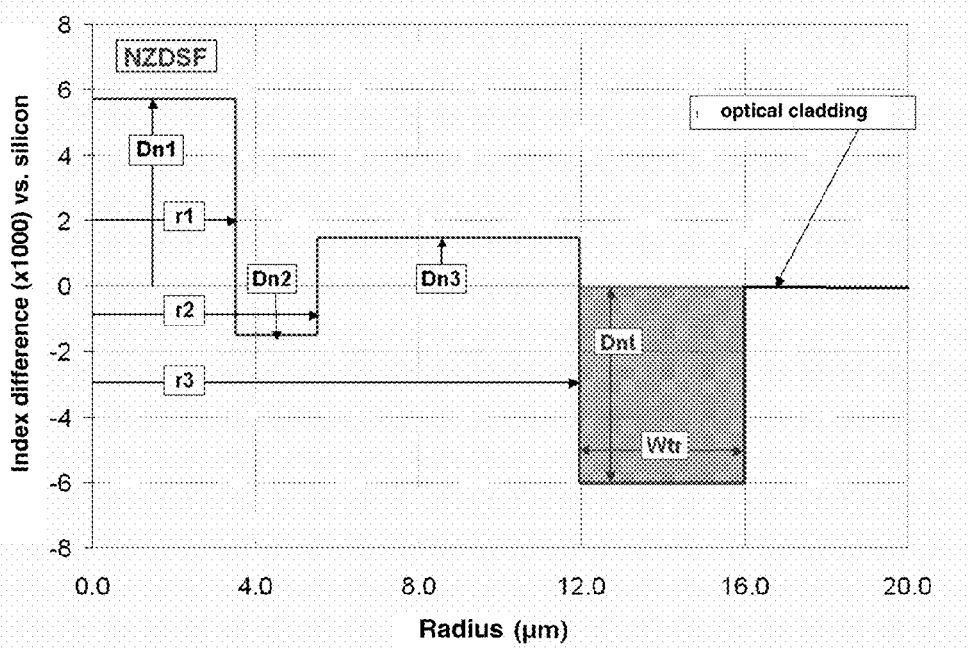
FIG. 4 schematically depicts the set profile of an NZDSF+ fiber according a second embodiment of the present invention.

Example 3a, 3b, and 3c, which embrace the present invention, correspond to an NZDSF as illustrated in FIG. 3, albeit with a fourth step-shaped cladding zone located between the ring and the buried trench. Examples 4a, 4b, and 4c, which also embrace the present invention, correspond to an NZDSF as illustrated in FIG. 4 (i.e., with three cladding zones located between the central core and the optical cladding).

It is then seen from Table II that the bending losses of the fiber according to the invention are equivalent to the bending losses in an SSMF, or even better. Further, the fiber according to the invention has reduced Rayleigh scattering losses as compared with a standard NZDSF. The Rayleigh scattering losses of the fiber according to the invention may be reduced to those of a standard SSMF. The attenuation in a fiber according to the invention is therefore close to that of an SSMF at the wavelength of 1550 nm.

It is also noted from Table II that the set of the three cladding zones located between the central core and the optical cladding is modified in a combination. Indeed, Example 2b clearly shows that, by simply adding a buried trench to a profile of a NZDSF having reduced Rayleigh losses, it is not possible to reduce bending losses while retaining the reduction in Rayleigh scattering losses.

It is also noted from Table II that with the profile of the fiber according to the invention, it is possible to guarantee a positive chromatic dispersion of less than 12 ps/(nm·km) with a dispersion slope of less than 0.09 ps/(nm²·km), an effective area larger than 50 µm², and a cut-off wavelength of less than 1600 nm. The fiber according to the invention will comply with the recommendations of the ITU-T G.655 and G.656 standards, which notably recommend a cable cut-off wavelength ($\lambda_{CC}$) of less than 1450 nm, a mode diameter between 8 and 11 µm, and a positive chromatic dispersion of less than 10 ps/(nm·km) at 1550 nm. The fiber according to the invention may thus be set up in numerous transmission systems with good compatibility with the other fibers of the system. These values of effective area, dispersion, and effective cut-off, all compliant with the requirements imposed by the G.655 and G.656 standards, may be achieved by selective configuration of the buried trench, the intermediate cladding, and the ring.

The present fibers may facilitate the reduction in overall optical-fiber diameter. As will be appreciated by those having ordinary skill in the art, a reduced-diameter optical fiber is cost-effective, requiring less raw material. Moreover, a reduced-diameter optical fiber requires less deployment space (e.g., within a buffer tube and/or fiber optic cable), thereby facilitating increased fiber count and/or reduced cable size.

Those having ordinary skill in the art will recognize that an optical fiber with a primary coating (and an optional secondary coating and/or ink layer) typically has an outer diameter of between about 235 microns and about 265 microns (µm). The component glass fiber itself (i.e., the glass core and surrounding cladding layers) typically has a diameter of about 125 microns, such that the total coating thickness is typically between about 55 microns and 70 microns.

With respect to the present optical fiber, the component glass fiber may have an outer diameter of about 125 microns. With respect to the optical fiber's surrounding coating layers, the primary coating may have an outer diameter of between about 175 microns and about 195 microns (i.e., a primary coating thickness of between about 25 microns and 35 microns) and the secondary coating may have an outer diameter of between about 235 microns and about 265 microns (i.e., a secondary coating thickness of between about 20 microns and 45 microns). Optionally, the present optical fiber may include an outermost ink layer, which is typically between two and ten microns.

In an alternative embodiment, the present optical fiber may possess a reduced diameter (e.g., an outermost diameter between about 150 microns and 230 microns). In this alternative optical fiber configuration, the thickness of the primary coating and/or secondary coating is reduced, while the diameter of the component glass fiber is maintained at about 125 microns. By way of example, in such embodiments the primary coating layer may have an outer diameter of between about 135 microns and about 175 microns (e.g., about 160 microns), and the secondary coating layer may have an outer diameter of between about 150 microns and about 230 microns (e.g., more than about 165 microns, such as 190-210 microns or so). In other words, the total diameter of the optical fiber is reduced to less than about 230 microns (e.g., about 200 microns).

As noted, the present optical fiber may include one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

The present optical fiber may be deployed in various structures, such as those exemplary structures disclosed hereinafter.

For example, one or more of the present optical fibers may be enclosed within a buffer tube. For instance, optical fiber may be deployed in either a single fiber loose buffer tube or a multi-fiber loose buffer tube. With respect to the latter, multiple optical fibers may be bundled or stranded within a buffer tube or other structure. In this regard, within a multi-fiber loose buffer tube, fiber sub-bundles may be separated with binders (e.g., each fiber sub-bundle is enveloped in a binder). Moreover, fan-out tubing may be installed at the termination of such loose buffer tubes to directly terminate loose buffered optical fibers with field-installed connectors.

In other embodiments, the buffer tube may tightly surround the outermost optical fiber coating (i.e., tight buffered fiber) or otherwise surround the outermost optical fiber coating or ink layer to provide an exemplary radial clearance of between about 50 and 100 microns (i.e., a semi-tight buffered fiber).

With respect to the former tight buffered fiber, the buffering may be formed by coating the optical fiber with a curable composition (e.g., a UV-curable material) or a thermoplastic material. The outer diameter of tight buffer tubes, regardless of whether the buffer tube is formed from a curable or non-curable material, is typically less about 1,000 microns (e.g., either about 500 microns or about 900 microns).

With respect to the latter semi-tight buffered fiber, a lubricant may be included between the optical fiber and the buffer tube (e.g., to provide a gliding layer).

As will be known by those having ordinary skill in the art, an exemplary buffer tube enclosing optical fibers as disclosed herein may be formed of polyolefins (e.g., polyethylene or polypropylene), including fluorinated polyolefins, polyesters (e.g., polybutylene terephthalate), polyamides (e.g., nylon), as well as other polymeric materials and blends. In general, a buffer tube may be formed of one or more layers. The layers may be homogeneous or include mixtures or blends of various materials within each layer.

In this context, the buffer tube may be extruded (e.g., an extruded polymeric material) or pultruded (e.g., a pultruded, fiber-reinforced plastic). By way of example, the buffer tube may include a material to provide high temperature and chemical resistance (e.g., an aromatic material or polysulfone material).

Although buffer tubes typically have a circular cross section, buffer tubes alternatively may have an irregular or non-circular shape (e.g., an oval or a trapezoidal cross-section).

Alternatively, one or more of the present optical fibers may simply be surrounded by an outer protective sheath or encapsulated within a sealed metal tube. In either structure, no intermediate buffer tube is necessarily required.

Multiple optical fibers as disclosed herein may be sandwiched, encapsulated, and/or edge bonded to form an optical fiber ribbon. Optical fiber ribbons can be divisible into subunits (e.g., a twelve-fiber ribbon that is splittable into six-fiber subunits). Moreover, a plurality of such optical fiber ribbons may be aggregated to form a ribbon stack, which can have various sizes and shapes.

For example, it is possible to form a rectangular ribbon stack or a ribbon stack in which the uppermost and lowermost optical fiber ribbons have fewer optical fibers than those toward the center of the stack. This construction may be useful to increase the density of optical elements (e.g., optical fibers) within the buffer tube and/or cable.

In general, it is desirable to increase the filling of transmission elements in buffer tubes or cables, subject to other constraints (e.g., cable or mid-span attenuation). The optical elements themselves may be designed for increased packing density. For example, the optical fiber may possess modified properties, such as improved refractive-index profile, core or cladding dimensions, or primary coating thickness and/or modulus, to improve microbending and macrobending characteristics.

By way of example, a rectangular ribbon stack may be formed with or without a central twist (i.e., a "primary twist"). Those having ordinary skill in the art will appreciate that a ribbon stack is typically manufactured with rotational twist to allow the tube or cable to bend without placing excessive mechanical stress on the optical fibers during winding, installation, and use. In a structural variation, a twisted (or untwisted) rectangular ribbon stack may be further formed into a coil-like configuration (e.g., a helix) or a wave-like configuration (e.g., a sinusoid). In other words, the ribbon stack may possess regular "secondary" deformations.

As will be known to those having ordinary skill in the art, such optical fiber ribbons may be positioned within a buffer tube or other surrounding structure, such as a buffer-tube-free cable. Subject to certain restraints (e.g., attenuation) it is desirable to increase the density of elements such as optical fibers or optical fiber ribbons within buffer tubes and/or optical fiber cables.

A plurality of buffer tubes containing optical fibers (e.g., loose or ribbonized fibers) may be positioned externally adjacent to and stranded around a central strength member. This stranding can be accomplished in one direction, helically, known as "S" or "Z" stranding, or Reverse Oscillated Lay stranding, known as "S—Z" stranding. Stranding about the central strength member reduces optical fiber strain when cable strain occurs during installation and use.

Those having ordinary skill in the art will understand the benefit of minimizing fiber strain for both tensile cable strain and longitudinal compressive cable strain during installation or operating conditions.

With respect to tensile cable strain, which may occur during installation, the cable will become longer while the optical fibers can migrate closer to the cable's neutral axis to reduce, if not eliminate, the strain being translated to the optical fibers. With respect to longitudinal compressive strain, which may occur at low operating temperatures due to shrinkage of the cable components, the optical fibers will migrate farther away from the cable's neutral axis to reduce, if not eliminate, the compressive strain being translated to the optical fibers.

In a variation, two or more substantially concentric layers of buffer tubes may be positioned around a central strength member. In a further variation, multiple stranding elements (e.g., multiple buffer tubes stranded around a strength member) may themselves be stranded around each other or around a primary central strength member.

Alternatively, a plurality of buffer tubes containing optical fibers (e.g., loose or ribbonized fibers) may be simply placed externally adjacent to the central strength member (i.e., the buffer tubes are not intentionally stranded or arranged around the central strength member in a particular manner and run substantially parallel to the central strength member).

Alternatively still, the present optical fibers may be positioned with a central buffer tube (i.e., the central buffer tube cable has a central buffer tube rather than a central strength member). Such a central buffer tube cable may position strength members elsewhere. For instance, metallic or non-metallic (e.g., GRP) strength members may be positioned within the cable sheath itself, and/or one or more layers of high-strength yarns (e.g., aramid or non-aramid yarns) may be positioned parallel to or wrapped (e.g., contrahelically) around the central buffer tube (i.e., within the cable's interior space). Likewise, strength members can be included within the buffer tube's casing.

In other embodiments, the optical fibers may be placed within a slotted core cable. In a slotted core cable, optical fibers, individually or as a fiber ribbon, may be placed within pre-shaped helical grooves (i.e., channels) on the surface of a central strength member, thereby forming a slotted core unit. The slotted core unit may be enclosed by a buffer tube. One or more of such slotted core units may be placed within a slotted core cable. For example, a plurality of slotted core units may be helically stranded around a central strength member.

Alternatively, the optical fibers may also be stranded in a maxitube cable design, whereby the optical fibers are stranded around themselves within a large multi-fiber loose buffer tube rather than around a central strength member. In other words, the large multi-fiber loose buffer tube is centrally positioned within the maxitube cable. For example, such maxitube cables may be deployed in optical ground wires (OPGW).

In another cabling embodiment, multiple buffer tubes may be stranded around themselves without the presence of a central member. These stranded buffer tubes may be surrounded by a protective tube. The protective tube may serve as the outer casing of the fiber optic cable or may be further surrounded by an outer sheath. The protective tube may tightly or loosely surround the stranded buffer tubes.

As will be known to those having ordinary skill in the art, additional elements may be included within a cable core. For example, copper cables or other active, transmission elements may be stranded or otherwise bundled within the cable sheath. Passive elements may also be placed within the cable core, such as between the interior walls of the buffer tubes and the enclosed optical fibers. Alternatively and by way of example, passive elements may be placed outside the buffer tubes between the respective exterior walls of the buffer tubes and the interior wall of the cable jacket, or, within the interior space of a buffer-tube-free cable.

For example, yarns, nonwovens, fabrics (e.g., tapes), foams, or other materials containing water-swellable material and/or coated with water-swellable materials (e.g., including super absorbent polymers (SAPs), such as SAP powder) may be employed to provide water blocking and/or to couple the optical fibers to the surrounding buffer tube and/or cable jacketing (e.g., via adhesion, friction, and/or compression). Exemplary water-swellable elements are disclosed in commonly assigned U.S. Patent Application Publication No. US 2007/0019915 A1 for a Water-Swellable Tape, Adhesive-Backed for Coupling When Used Inside a Buffer Tube (Overton et al.), each of which is hereby incorporated by reference in its entirety.

Moreover, an adhesive (e.g., a hot-melt adhesive or curable adhesive, such as a silicone acrylate cross-linked by exposure to actinic radiation) may be provided on one or more passive elements (e.g., water-swellable material) to bond the elements to the buffer tube. An adhesive material may also be used to bond the water-swellable element to optical fibers within the buffer tube. Exemplary arrangements of such elements are disclosed in commonly assigned U.S. Patent Application Publication No. US 2008/0145010 A1 for a Gel-Free Buffer Tube with Adhesively Coupled Optical Element (Overton et al.), which is hereby incorporated by reference in its entirety.

The buffer tubes (or buffer-tube-free cables) may also contain a thixotropic composition (e.g., grease or grease-like gels) between the optical fibers and the interior walls of the buffer tubes. For example, filling the free space inside a buffer tube with water-blocking, petroleum-based filling grease helps to block the ingress of water. Further, the thixotropic filling grease mechanically (i.e., viscously) couples the optical fibers to the surrounding buffer tube.

Such thixotropic filling greases are relatively heavy and messy, thereby hindering connection and splicing operations. Thus, the present optical fibers may be deployed in dry cable structures (i.e., grease-free buffer tubes).

Exemplary buffer tube structures that are free from thixotropic filling greases are disclosed in commonly assigned U.S. Patent Application Publication No. US 2009/0003785 A1 for a Coupling Composition for Optical Fiber Cables (Parris et al.), which is hereby incorporated by reference in its entirety. Such buffer tubes employ coupling compositions formed from a blend of high-molecular weight elastomeric polymers (e.g., about 35 weight percent or less) and oils (e.g., about 65 weight percent or more) that flow at low temperatures. Unlike thixotropic filling greases, the coupling composition (e.g., employed as a cohesive gel or foam) is typically dry and, therefore, less messy during splicing.

As will be understood by those having ordinary skill in the art, a cable enclosing optical fibers as disclosed herein may have a sheath formed from various materials in various designs. Cable sheathing may be formed from polymeric materials such as, for example, polyethylene, polypropylene, polyvinyl chloride (PVC), polyamides (e.g., nylon), polyester (e.g., PBT), fluorinated plastics (e.g., perfluorethylene propylene, polyvinyl fluoride, or polyvinylidene difluoride), and ethylene vinyl acetate. The sheath and/or buffer tube materials may also contain other additives, such as nucleating agents, flame-retardants, smoke-retardants, antioxidants, UV absorbers, and/or plasticizers.

The cable sheathing may be a single jacket formed from a dielectric material (e.g., non-conducting polymers), with or without supplemental structural components that may be used to improve the protection (e.g., from rodents) and strength provided by the cable sheath. For example, one or more layers of metallic (e.g., steel) tape along with one or more dielectric jackets may form the cable sheathing. Metallic or fiberglass reinforcing rods (e.g., GRP) may also be incorporated into the sheath. In addition, aramid, fiberglass, or polyester yarns may be employed under the various sheath materials (e.g., between the cable sheath and the cable core), and/or ripcords may be positioned, for example, within the cable sheath.

Similar to buffer tubes, optical fiber cable sheaths typically have a circular cross section, but cable sheaths alternatively may have an irregular or non-circular shape (e.g., an oval, trapezoidal, or flat cross-section).

By way of example, the present optical fiber may be incorporated into single-fiber drop cables, such as those employed for Multiple Dwelling Unit (MDU) applications. In such deployments, the cable jacketing must exhibit crush resistance, abrasion resistance, puncture resistance, thermal stability, and fire resistance as required by building codes. An exemplary material for such cable jackets is thermally stable, flame-retardant polyurethane (PUR), which mechanically protects the optical fibers yet is sufficiently flexible to facilitate easy MDU installations. Alternatively, a flame-retardant polyolefin or polyvinyl chloride sheath may be used.

In general and as will be known to those having ordinary skill in the art, a strength member is typically in the form of a rod or braided/helically wound wires or fibers, though other configurations will be within the knowledge of those having ordinary skill in the art.

Optical fiber cables containing optical fibers as disclosed may be variously deployed, including as drop cables, distribution cables, feeder cables, trunk cables, and stub cables, each of which may have varying operational requirements (e.g., temperature range, crush resistance, UV resistance, and minimum bend radius).

Such optical fiber cables may be installed within ducts, microducts, plenums, or risers. By way of example, an optical fiber cable may be installed in an existing duct or microduct by pulling or blowing (e.g., using compressed air). An exemplary cable installation method is disclosed in commonly assigned U.S. Patent Application Publication No. 2007/0263960 for a Communication Cable Assembly and Installation Method (Lock et al.), and U.S. Patent Application Publication No. 2008/0317410 for a Modified Pre-Ferrulized Communication Cable Assembly and Installation Method (Griffioen et al.), each of which is incorporated by reference in its entirety.

As noted, buffer tubes containing optical fibers (e.g., loose or ribbonized fibers) may be stranded (e.g., around a central strength member). In such configurations, an optical fiber cable's protective outer sheath may have a textured outer surface that periodically varies lengthwise along the cable in a manner that replicates the stranded shape of the underlying buffer tubes. The textured profile of the protective outer sheath can improve the blowing performance of the optical fiber cable. The textured surface reduces the contact surface between the cable and the duct or microduct and increases the friction between the blowing medium (e.g., air) and the cable. The protective outer sheath may be made of a low coefficient-of-friction material, which can facilitate blown installation. Moreover, the protective outer sheath can be provided with a lubricant to further facilitate blown installation.

In general, to achieve satisfactory long-distance blowing performance (e.g., between about 3,000 to 5,000 feet or more), the outer cable diameter of an optical fiber cable should be no more than about seventy to eighty percent of the duct's or microducts inner diameter.

Compressed air may also be used to install optical fibers in an air blown fiber system. In an air blown fiber system, a network of unfilled cables or microducts is installed prior to the installation of optical fibers. Optical fibers may subsequently be blown into the installed cables as necessary to support the network's varying requirements.

Moreover, the optical fiber cables may be directly buried in the ground or, as an aerial cable, suspended from a pole or pylon. An aerial cable may be self-supporting or secured or lashed to a support (e.g., messenger wire or another cable). Exemplary aerial fiber optic cables include overhead ground wires (OPGW), all-dielectric self-supporting cables (ADSS), all dielectric lash cables (AD-Lash), and figure-eight cables, each of which is well understood by those having ordinary skill in the art. (Figure-eight cables and other designs can be directly buried or installed into ducts, and may optionally include a toning element, such as a metallic wire, so that they can be found with a metal detector.

In addition, although the optical fibers may be further protected by an outer cable sheath, the optical fiber itself may be further reinforced so that the optical fiber may be included within a breakout cable, which allows for the individual routing of individual optical fibers.

To effectively employ the present optical fibers in a transmission system, connections are required at various points in the network. Optical fiber connections are typically made by fusion splicing, mechanical splicing, or mechanical connectors.

The mating ends of connectors can be installed to the fiber ends either in the field (e.g., at the network location) or in a factory prior to installation into the network. The ends of the connectors are mated in the field in order to connect the fibers together or connect the fibers to the passive or active components. For example, certain optical fiber cable assemblies (e.g., furcation assemblies) can separate and convey individual optical fibers from a multiple optical fiber cable to connectors in a protective manner.

The deployment of such optical fiber cables may include supplemental equipment. For instance, an amplifier may be included to improve optical signals. Dispersion compensating modules may be installed to reduce the effects of chromatic dispersion and polarization mode dispersion. Splice boxes, pedestals, and distribution frames, which may be protected by an enclosure, may likewise be included. Additional elements include, for example, remote terminal switches, optical network units, optical splitters, and central office switches.

A cable containing the present optical fibers may be deployed for use in a communication system (e.g., networking or telecommunications). A communication system may include fiber optic cable architecture such as fiber-to-the-node (FTTN), fiber-to-the-telecommunications enclosure (FTTE), fiber-to-the-curb (FTTC), fiber-to-the-building (FTTB), and fiber-to-the-home (FTTH), as well as long-haul or metro architecture. Moreover, an optical module or a storage box that includes a housing may receive a wound portion of the optical fiber disclosed herein. By way of example, the optical fiber may be wound with a bending radius of less than about 15 millimeters (e.g., 10 millimeters or less, such as about 5 millimeters) in the optical module or the storage box.

Moreover, present optical fibers may be used in other applications, including, without limitation, fiber optic sensors or illumination applications (e.g., lighting).

This application incorporates entirely by reference the following commonly assigned patent applications: U.S. Patent Application No. 60/986,737 for a Microbend-Resistant Optical Fiber, filed Nov. 9, 2007, (Overton); U.S. Patent Application No. 61/041,484 for a Microbend-Resistant Optical Fiber, filed Apr. 1, 2008, (Overton); U.S. Patent Application No. 61/112,595 for a Microbend-Resistant Optical Fiber, filed Nov. 7, 2008, (Overton), International Patent Application No. PCT/US08/82927 Microbend-Resistant Optical Fiber, filed Nov. 9, 2008, (Overton), and U.S. patent application Ser. No. 12/267,732 for a Microbend-Resistant Optical Fiber, filed Nov. 10, 2008, (Overton).

This application further incorporates entirely by reference the following commonly assigned patent, patent application publications, and patent applications: U.S. Pat. No. 4,838,643 for a Single Mode Bend Insensitive Fiber for Use in Fiber Optic Guidance Applications (Hodges et al.); U.S. Patent Application Publication No. US 2007/0127878 A1 and its related U.S. patent application Ser. No. 11/556,895 for a Single Mode Optical Fiber (de Montmorillon et al.); U.S. Patent Application Publication No. US 2007/0280615 A1 and its related U.S. patent application Ser. No. 11/697,994 for a Single-Mode Optical Fiber (de Montmorillon et al.); U.S. Pat. No. 7,356,234 and its related U.S. patent application Ser. No. 11/743,365 for Chromatic Dispersion Compensating Fiber (de Montmorillon et al.); U.S. Pat. No. 7,483,613 for Chromatic Dispersion Compensating Fiber (de Montmorillon et al.); U.S. Patent Application Publication No. US 2008/0152288 A1 and its related U.S. patent application Ser. No. 11/999,333 for an Optical Fiber (Flammer et al.); U.S. patent application Ser. No. 12/098,804 for Transmission Optical Fiber Having Large Effective Area (Sillard et al.); U.S. Patent Application No. 61/101,337 for a Single Mode Optical Fiber, filed Sep. 30, 2008, (de Montmorillon et al.); U.S. Patent Application No. 61/112,006 for a Bend-Insensitive Single-Mode Optical Fiber, filed Nov. 6, 2008, (de Montmorillon et al.); and U.S. Patent Application No. 61/112,374 for a Bend-Insensitive Single Mode Optical Fiber, filed Nov. 7, 2008, (de Montmorillon et al.).

This application further incorporates entirely by reference the following commonly assigned patent, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for Optical Unit for Fiber Optic Cables; U.S. Pat. No. 6,066,397 for Polypropylene Filler Rods for Optical Fiber Communications Cables; U.S. Pat. No. 6,175,677 for Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for Method for Accessing Optical Fibers in the Midspan Region of an Optical Fiber Cable; U.S. Pat. No. 6,381,390 for Color-Coded Optical Fiber Ribbon and Die for Making the Same; U.S. Pat. No. 6,181,857 for Method for Accessing Optical Fibers Contained in a Sheath; U.S. Pat. No. 6,314,224 for Thick-Walled Cable Jacket with Non-Circular Cavity Cross Section; U.S. Pat. No. 6,334,016 for Optical Fiber Ribbon Matrix Material Having Optimal Handling Characteristics; U.S. Pat. No. 6,321,012 for Optical Fiber Having Water Swellable Material for Identifying Grouping of Fiber Groups; U.S. Pat. No. 6,321,014 for Method for Manufacturing Optical Fiber Ribbon; U.S. Pat. No. 6,210,802 for Polypropylene Filler Rods for Optical Fiber Communications Cables; U.S. Pat. No. 6,493,491 for Optical Drop Cable for Aerial Installation; U.S. Pat. No. 7,346,244 for Coated Central Strength Member for Fiber Optic Cables with Reduced Shrinkage; U.S. Pat. No. 6,658,184 for Protective Skin for Optical Fibers; U.S. Pat. No. 6,603,908 for Buffer Tube that Results in Easy Access to and Low Attenuation of Fibers Disposed Within Buffer Tube; U.S. Pat. No. 7,045,010 for Applicator for High-Speed Gel Buffering of Flextube Optical Fiber Bundles; U.S. Pat. No. 6,749,446 for Optical Fiber Cable with Cushion Members Protecting Optical Fiber Ribbon Stack; U.S. Pat. No. 6,922,515 for Method and Apparatus to Reduce Variation of Excess Fiber Length in Buffer Tubes of Fiber Optic Cables; U.S. Pat. No. 6,618,538 for Method and Apparatus to Reduce Variation of Excess Fiber Length in Buffer Tubes of Fiber Optic Cables; U.S. Pat. No. 7,322,122 for Method and Apparatus for Curing a Fiber Having at Least Two Fiber Coating Curing Stages; U.S. Pat. No. 6,912,347 for Optimized Fiber Optic Cable Suitable for Microduct Blown Installation; U.S. Pat. No. 6,941,049 for Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Patent Application Publication No. US 2007/0019915 A1 for a Water-Swellable Tape, Adhesive-Backed for Coupling When Used Inside a Buffer Tube (Overton et al.); International Patent Application Publication No. 2007/013923 for Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Patent Application Publication No. US 2007/0183726 A1 for an Optical Fiber Cable Suited for Blown Installation or Pushing Installation in Microducts of Small Diameter (Nothofer et al.); U.S. Patent Application Publication No. US 2008/0037942 A1 for an Optical Fiber Telecommunications Cable (Tatat); U.S. Patent Application Publication No. US 2008/0145010 A1 for a Gel-Free Buffer Tube with Adhesively Coupled Optical Element (Overton et al.); U.S. Patent Application Publication No. US 2008/0181564 A1 for a Fiber Optic Cable Having a Water-Swellable Element (Overton); U.S. Patent Application Publication No. US 2009/0041414 A1 for a Method for Accessing Optical Fibers within a Telecommunication Cable (Lavenne et al.); U.S. Patent Application Publication No. US 2009/0003781 A1 for an Optical Fiber Cable Having a Deformable Coupling Element (Parris et al.); U.S. Patent Application Publication No. US 2009/0003779 A1 for an Optical Fiber Cable Having Raised Coupling Supports (Parris); and U.S. Patent Application Publication No. US 2009/0003785 A1 for a Coupling Composition for Optical Fiber Cables (Parris et al.)

In the specification and figures, typical embodiments of the invention have been disclosed. The present invention is not limited to such exemplary embodiments. The figures are schematic representations and so are not necessarily drawn to scale. Unless otherwise noted, specific terms have been used in a generic and descriptive sense and not for purposes of limitation.

The invention claimed is:

1. A dispersion-shifted optical fiber (NZDSF), comprising from its center towards its periphery, a central core, an inner cladding comprising at least three zones, and an optical cladding, the central core having a radius ($r_1$) and an index difference ($Dn_1$) with the optical cladding, the inner cladding comprising from the central core towards the optical cladding:
    an intermediate cladding having a radius ($r_2$) and index difference ($Dn_2$) with the optical cladding;
    a ring having a radius ($r_3$) and an index difference ($Dn_3$) with the optical cladding; and
    a buried trench having a radius ($r_{tr}$), a width ($W_{tr}$) of between 2.5 µm and 5.5 µm, and an index difference ($Dn_t$) with the optical cladding of between $-5 \times 10^{-3}$ and $-15 \times 10^{-3}$;
    wherein the optical fiber possesses:
    Rayleigh scattering losses of less than or equal to 0.164 dB/km at a wavelength of 1550 nm;
    bending losses of less than 0.5 dB/turn for a bending radius of 16 millimeters at a wavelength of 1550 nm; and
    bending losses of less than 0.5 dB/100 turns for a bending radius of 30 millimeters at a wavelength of 1625 nm.

2. The optical fiber according to claim 1, wherein the central core has an index difference ($Dn_1$) with the optical cladding of less than $7.5 \times 10^{-3}$.

3. The optical fiber according to claim 1, wherein the intermediate cladding has an index difference ($Dn_2$) with the optical cladding of between $-2.5 \times 10^{-3}$ and $1.5 \times 10^{-3}$.

4. The optical fiber according to claim 1, wherein the ring has an index difference ($Dn_3$) with the optical cladding of between 0.0 and $5 \times 10^{-3}$.

5. The optical fiber according to claim 1, further comprising a fourth inner cladding zone located between the ring ($r_3$, $Dn_3$) and the buried trench zone ($W_{tr}$, $Dn_t$), the fourth cladding zone having a radius ($r_4$) and an index difference ($Dn_4$) with the optical cladding of between $-2.5 \times 10^{-3}$ and $1 \times 10^{-3}$.

6. The optical fiber according to claim 5, wherein the radius ($r_4$) of the fourth cladding zone is between 11 µm and 14.5 µm.

7. The optical fiber according to claim 1, wherein the radius of the central core ($r_1$) is between 2 µm and 4.35 µm.

8. The optical fiber according to claim 1, wherein the outer radius of the intermediate cladding ($r_2$) is between 4.5 µm and 8.5 µm.

9. The optical fiber according to claim 1, wherein the ring has a width ($r_3 - r_2$) between 3 µm and 7.5 µm.

10. The optical fiber according to claim 1, wherein the radius of the buried trench ($r_{tr}$) is less than or equal to 17 µm.

11. The optical fiber according to claim 1, wherein the buried trench has an inner radius of at least 10 µm.

12. The optical fiber according to claim 1, wherein, at a wavelength of 1550 nm, the optical fiber possesses a chromatic dispersion of less than 12 ps/(nm·km).

13. The optical fiber according to claim 1, wherein, at a wavelength of 1550 nm, the optical fiber possesses a chromatic dispersion slope of less than or equal to 0.09 ps/(nm²·km).

14. The optical fiber according to claim 1, wherein the optical fiber possesses an effective cut-off wavelength ($\lambda_{Ceff}$) of less than 1600 nm.

15. The optical fiber according to claim 1, wherein the optical fiber possesses an effective area larger than 50 µm².

16. A dispersion-shifted optical fiber, comprising:
    a central core surrounded by an optical cladding, said central core having an outer radius ($r_1$) and an index difference ($Dn_1$) with said optical cladding;
    an intermediate cladding contiguously surrounding said central core, said intermediate cladding having an outer radius ($r_2$) and index difference ($Dn_2$) with said optical cladding of greater than $-2.5 \times 10^{-3}$;

a ring positioned between said intermediate cladding and said optical cladding, said ring having an outer radius ($r_3$) and an index difference ($Dn_3$) with said optical cladding; and a buried trench positioned between said ring and said optical cladding, said buried trench having an outer radius ($r_{tr}$), a width ($W_{tr}$) of between 2.5 μm and 5.5 μm, and a negative index difference ($Dn_t$) with said optical cladding of between $-5\times10^{-3}$ and $-15\times10^{-3}$;

wherein the optical fiber possesses Rayleigh scattering losses of 0.164 dB/km or less at a wavelength of 1550 nm;

wherein the optical fiber exhibits bending losses of 0.5 dB/turn or less for a bending radius of 16 millimeters at a wavelength of 1550 nm; and wherein the optical fiber exhibits bending losses of 0.5 dB/100 turns or less for a bending radius of 30 millimeters at a wavelength of 1625 nm.

17. The optical fiber according to claim 16, wherein said intermediate cladding has an index difference ($Dn_2$) with said optical cladding of between $-1.5\times10^{-3}$ and $1.5\times10^{-3}$.

18. The optical fiber according to claim 16, wherein the optical fiber has, for a wavelength of 1550 nm, a chromatic dispersion slope of between about 0.050 ps/(nm²·km) and 0.090 ps/(nm²·km).

19. The optical fiber according to claim 16, wherein the optical fiber possesses an effective cut-off wavelength ($\lambda_{Ceff}$) of less than 1600 nm.

20. A dispersion-shifted optical fiber, comprising:

a central core surrounded by an optical cladding, said central core having an outer radius ($r_1$) and an index difference ($Dn_1$) with said optical cladding;

an intermediate cladding positioned between said central core and said optical cladding, said intermediate cladding having an outer radius ($r_2$) and index difference ($Dn_2$) with said optical cladding;

a ring positioned between said intermediate cladding and said optical cladding, said ring having an outer radius ($r_3$) and an index difference ($Dn_3$) with said optical cladding;

a step cladding positioned between said ring and said optical cladding, said step cladding having an outer radius ($r_4$) and an index difference ($Dn_4$) with said optical cladding; and a buried trench positioned between said step cladding and said optical cladding, said buried trench having an outer radius ($r_{tr}$), a width ($W_{tr}$), and a negative index difference ($Dn_t$) with said optical cladding;

wherein the optical fiber possesses Rayleigh scattering losses of less than or equal to 0.164 dB/km at a wavelength of 1550 nm.

21. The optical fiber according to claim 20, wherein said intermediate cladding's index difference ($Dn_2$) is greater than $-2.5\times10^{-3}$ and less than $1.5\times10^{-3}$.

22. The optical fiber according to claim 20, wherein the optical fiber exhibits bending losses of 0.5 dB/turn or less for a bending radius of 16 millimeters at a wavelength of 1550 nm; and wherein the optical fiber exhibits bending losses of 0.5 dB/100 turns or less for a bending radius of 30 millimeters at a wavelength of 1625 nm.

* * * * *